3,512,991
PROCESS FOR PREPARING COMPRESSED, DEHYDRATED CELLULAR BAKERY PRODUCTS

John J. Mancuso, Astoria, Anthony G. Bonagura, West Nyack, and Richard M. Sorge, Yonkers, N.Y., assignors to General Foods Corporation, White Plains, N.Y., a corporation of Delaware
No Drawing. Filed Oct. 7, 1965, Ser. No. 493,915
Int. Cl. A21d 13/00, 13/08
U.S. Cl. 99—86                                      10 Claims

ABSTRACT OF THE DISCLOSURE

Compressed, dehydrated bread is prepared by conditioning the bread at a reduced temperature, compressing the bread to about one-half to one-third its original volume, freezing the compressed bread and freeze-drying the frozen, compressed bread. The resulting product retains its compressed state and rehydrates rapidly, reverting to its original size and state of freshness.

---

The invention herein described was made in the course of or under a contract with the Department of Defense, Department of the Army.

The present invention relates to cooked cellular products such as baked goods, and more particularly to such products in a rapidly rehydratable compressed form.

One of the disadvantages associated with baked goods, e.g., bread, cake and the like, is that these products have a low bulk density so that a considerable amount of space is required to store and transport a relatively small weight of these products. Moreover, these products have a short shelf storage life and in the absence of special precautions, such as refrigeration, will spoil in a few days.

It is an object of the present invention to provide means for reducing the volume of cooked, cellular products during handling, storage and transportation. Another object is to provide cooked cellular products of reduced volume which may be easily restored to their original volume and bulk density prior to consumption. Another object is to provide a cooked cellular product which has an extended shelf life. A further object is to provide a method for extending the shelf storage life of these products without the necessity of taking special precautions such as refrigeration or adding special preservatives. These and other objects will become apparent as the description proceeds.

As disclosed in copending application Ser. No. 393,781, filed Sept. 1, 1964, and now abandoned, assigned to the assignee of this application, bread that has been partially dehydrated, then compressed, and, after being compressed, is further dehydrated, will retain its compressed shape without the necessity of special packaging. The bread is first partially dehydrated so that when it is compressed it will remain in the compressed state while it is being dehydrated without the need of compressive forces.

It has now been discovered that if cooked cellular products, having their normal moisture content, are compressed, then frozen, and while frozen, dehydrated to a final moisture content of about 6% to about 11%, they will retain their compressed state without the necessity of special packaging. Thus when it is desired to produce a compressed, dehydrated, cellular food product it is no longer necessary to partially dehydrate it prior to compression in order to maintain it in the compressed state during dehydration.

According to one embodiment of the present invention, individual slices of cooked cellular products are wrapped in moisture proof packaging such as aluminum foil and conditioned at a reduced temperature until moisture and temperature equilibrium is reached. It is important, however, that the conditioning temperature is not below the freezing temperature of the commodity that is being conditioned, for if the food product is frozen prior to compression it will shatter upon being compressed. Upon reaching moisture and temperature equilibrium the wrapper is removed from the food product and the food product is compressed to a reduced volume, for example to from about one-half to about one-third of its original volume. The compression may be carried out by any suitable means, such as by the mechanical application of pressure by means of a press. In a preferred method the plates of the press are chilled prior to use. The plates can be chilled by any known means such as by packing them with Dry Ice. The product is then compressed between the chilled plates. Freezing is accomplished during and after compression. The cooked cellular product will maintain its compressed state even after the compressive forces have been removed, provided it is maintained in a frozen state. While in the frozen state, the cooked cellular product is subjected to freeze-drying. In freeze-drying the food being dried is maintained in a frozen state and the moisture is removed by exposing the frozen food to controlled amounts of heat under vacuum conditions. The moisture sublimes directly from the ice state to the gaseous state without wetting the food. The freeze-drying is continued until the moisture content of the compressed product is from 6–11% by weight. At moisture levels of below about 6% rehydration of the baked goods is more difficult, while at moisture levels of above 11% the product tends to expand and may not maintain its compressed condition. The preferred moisture content of the dehydrated product varies with the product being dehydrated. For example, the preferred moisture content of compressed bread is between 9–11% while that of compressed cake is slightly lower. The preferred moisture content for each foodstuff being dehydrated can easily be determined by experimentation.

In some instances it may be preferable to autoclave the product before compression. The autoclaving procedure firms the product structure and provides a better rehydration range, so that the rehydrated product may more nearly approximate the texture of freshly baked goods without becoming soggy. The autoclaving is done at a pressure of from about 5 to 15 p.s.i.g. for a period of about 10 minutes. More preferably the product is autoclaved at 10 p.s.i.g. (230° F.). After autoclaving, the food product is conditioned at a reduced temperature, as outlined above.

After the compressed food product has been dehydrated, it is packaged in a moisture proof container. The compressed dehydrated food product will maintain its compressed state even when restored to room temperature, provided it is not exposed to an atmosphere of high humidity. The compressed dried food-stuff is shelf stable at room temperature for prolonged periods of time and can easily be transported and stored at a considerable savings in cost due to its reduced bulk.

To restore the compressed dehydrated food product to its original size and moisture level, one need only add moisture to said product, so that the moisture content will be restored to that of the freshly prepared product. This may be accomplished by a variety of ways, the simplest of which is to merely dip the compressed product in water for a few seconds. Alternatively, instead of dipping the bread in water, the water may be sprayed on the bread. Another method is to maintain the compressed product in a high relative humidity room for a time sufficient to permit the product to equilibrate to the desired moisture level. A third method is to package the product in a wicking container so that when it is desired to rehydrate the product a predetermined amount of water is brought into contact with the product by wetting the wicking container. Various materials such as carrageenin, sodium alginate and the like may be used to increase the rate of rehydration of the dry product. The use of these additives in aiding the rehydration of dehydrated foodstuffs is disclosed in copending application Ser. No. 393,781, filed Sept. 1, 1964, and now abandoned, identified above.

In order that the invention may be better understood, the following examples will serve to illustrate specific features of the invention, but it will be understood that the invention is not limited thereto. In the examples where bread was compressed and dehydrated the crust was first removed to facilitate the rehydration step. However, the present invention includes bread which has a crust and also bread that is baked without developing a crust, such as is taught in Pat. 3,161,523, issued to L. J. Ort.

The bread which was used in the examples was brought on the open market and was already baked and sliced. The cake and waffles were prepared from commercial dry mixes. It is to be understood, however, that in practicing the present invention the foodstuffs to be compressed and dehydrated can be made from the raw ingredients.

EXAMPLE I

Bread slices which had the crust removed, having a thickness of 12 mm. were autoclaved in a Castle autoclave at 10 p.s.i.g. for 10 minutes. The autoclaved slices were then wrapped in aluminum foil and conditioned overnight at 35° F. After conditioning, the bread slices were removed from the aluminum foil and were compressed to 4 mm. in thickness by means of platens cooled with Dry Ice to −28° F. and frozen. The bread slices were freeze-dried to a final moisture content of approximately 10%. The bread slices were rehydrated by being dipped in water for 6 seconds. A slightly moist slice of bread was obtained. The normal crumb texture and appearance was retained.

EXAMPLE II

The procedure described in Example I was repeated except that the conditioning took place at 0° F., 15° F. and 70° F. These samples were dipped in water for 6 seconds. The following results were obtained:

Table I

| Conditioning temperature, ° F. | Product condition |
|---|---|
| 0 | Fully hydrated, moist crumb. |
| 15 | Fully hydrated, slightly moist crumb. |
| 70 | Not fully hydrated crumb. |

This example illustrates that bread which was conditioned at 0° F. and also at 15° F. hydrated satisfactorily while bread which was conditioned at 70° F. did not give a satisfactory product.

EXAMPLE III

Bread slices that had the crust removed, having a thickness of 12 mm. were autoclaved in a Castle autoclave at 10 p.s.i.g. for 10 minutes. The autoclaved slices were then wrapped in aluminum foil and conditioned overnight at 25° F. After conditioning, the bread slices were removed from the aluminum foil and were compressed to 4 mm. in thickness by means of platens cooled with ethylene glycol to 0° F. and frozen. While still in the frozen condition the bread slices were freeze-dried to a final moisture content of approximately 10%. The bread slices were rehydrated by being dipped in water for six seconds. Slightly moist slices of bread were obtained. The normal crumb texture and appearance were retained.

EXAMPLE IV

Bread slices which had the crust removed, having a thickness of 12 mm. were autoclaved in a Castle autoclave at 10 p.s.i.g. for 10 minutes. The autoclaved slices were wrapped in aluminum foil and conditioned overnight at 40° F. The bread slices were divided into four groups. The temperature of the first group was lowered to 35° F.; the second group to 25° F.; the third group to 15° F.; and the fourth group to 5° F. The bread samples were held at these temperatures for from one to two hours, allowing them to equilibrate. The bread slices were then compressed to 4 mm. in thickness and frozen by means of platens cooled by means of ethylene glycol at 0° F. and frozen. While still in a frozen state the bread slices were freeze-dried to a final moisture content of approximately 10%. The bread samples were dipper in water for 6 seconds. The following results were obtained:

Table II

| Conditioning temperature, ° F. | Product condition |
|---|---|
| 35 | Fully hydrated, slightly moist crumb. |
| 25 | Fully hydrated, slightly moist crumb. |
| 15 | Fully hydrated, moist crumb. |
| 5 | Fully hydrated, moist crumb. |

This example shows that the bread can be compressed within a wide range of temperatures.

Sponge cake slices have a thickness of 12 mm. were autoclaved in a Castle autoclave at 10 p.s.i.g. for 10 minutes. The autoclaved slices were then wrapped in aluminum foil and conditioned overnight at 25° F. After conditioning, the cake slices were removed from the aluminum foil and were compressed to four mm. by means of platens cooled with Dry Ice to −28° F. and frozen. While still in the frozen condition the cake slices were freeze dried to a final moisture content of approximately 7%. The cake slices were rehydrated by being dipped in water for 3 seconds. A slightly moist slice of sponge cake was obtained. The normal crumb texture and appearance was retained.

EXAMPLE VI

The procedure described in Example V was repeated except that the autoclaving step was omitted. The cake slices were rehydrated by being dipped in water for 3 seconds. A slightly moist slice of sponge cake was obtained. The normal crumb texture and appearance was retained. Examples V and VI illustrate that the instant invention gives good results when sponge cake is the product that is compressed and rehydrated. Example VI further shows that it is not always necessary to autoclave the food products being dehydrated.

EXAMPLE VII

Devil's Food cake slices having a thickness of 12 mm. were autoclaved in a Castle autoclave at 10 p.s.i.g. for 10 minutes. The autoclaved slices were then wrapped in aluminum foil and conditioned overnight at 25° F. After conditioning, the cake slices were removed from the aluminum foil and were compressed to 6 mm. by means of platens cooled with Dry Ice to −28° F. and frozen. While still in the frozen state the cake slices were freeze-dried to a final moisture content of approximately 6%. The cake slices were rehydrated by being dipped in water for 3 seconds. Slightly moist slices of Devil's food cake was obtained. The normal crumb texture and appearance was retained.

EXAMPLE VIII

Waffles having a maximum thickness of approximately 15 mm. were wrapped in aluminum foil and conditioned overnight at 25° F. After conditioning, the waffles were removed from the aluminum foil and were compressed to 5 mm. by means of platens cooled by Dry Ice to −28° F. and frozen. While still in the frozen condition, the waffles were freeze-dried to a final moisture content of approximately 10%. The waffles were rehydrate by being dipped in water for 6 seconds. A slightly moist waffle was obtained. Normal texture and appearance was retained.

EXAMPLE IX

A bread slice that was prepared according to the procedure of Example I was vacuum sealed in aluminum foil and stored at room temperature. After six months the bread was removed from the aluminum foil and was rehydrated by being dipped in water for six seconds. A slightly moist slice of bread was obtained. The normal crumb texture, appearance and taste were retained.

While there has been shown several different examples embodying the present invention, other variations will occur to those skilled in the art from the foregoing disclosure. We do not wish to be limited, therefore, except to the scope of the appended claims.

What is claimed as new and desired to be secured by Letters Patent is:

1. A process of preparing a rehydratable compressed cooked, cellular product selected from the group consisting of bread, cake, waffles and doughnuts comprising:
    (a) conditioning said cooked cellular product by holding it at temperature of from 0° F. to about 40° F. for a period of time sufficient to equilibrate moisture and temperature and simultaneously compressing said cooked cellular product to a reduced volume.
    (b) freezing said compressed cooked cellular product, and
    (c) freeze-drying said compressed frozen cooked cellular product to a final moisture content of from about 6% to about 11%.

2. A process according to claim 1 wherein the cooked cellular product is autoclaved at a pressure of 5–15 p.s.i.g. for about 10 minutes before being conditioned and compressed.

3. A process according to claim 1 wherein said cooked cellular product is compressed to about one-half to about one-third its original volume.

4. A process for preparing a rehydratable cooked cellular product selected from the group consisting of bread, cake, waffles and doughnuts comprising:
    (a) conditioning said cooked cellular product by holding it at a temperature of from about 0° F. to about 40° F. for a period of time sufficient to equilibrate moisture and temperature,
    (b) compressing said conditioned cooked cellular product from about one-half to about one-third its original volume,
    (c) freezing said cooked cellular product while in the compressed state, and
    (d) freeze-drying said compressed frozen product to a final moisture content of from about 6% to about 11%.

5. A process according to claim 4 wherein the cooked cellular product is bread.

6. A process accoridng to claim 4 wherein the cooked cellular product is cake.

7. A process according to claim 4 wherein the cooked cellular product is a waffle.

8. A process according to claim 4 wherein the cooked cellular product is a doughnut.

9. A process according to claim 4 wherein said cooked cellular product is autoclaved at a pressure of 5–15 p.s.i.g. for about 10 minutes before being conditioned.

10. A process for preparing a dehydrated bread slice which can be easily rehydrated comprising:
    (a) conditioning said bread slice at a temperature of from about 0° F. to about 40° F. for a period of time sufficient to equilibrate moisture and temperature,
    (b) compressing said conditioned bread slice to about one-half to one-third its original volume,
    (c) freezing said compressed bread slice, and
    (d) freeze-drying said compressed frozen bread slice to a final moisture content of from about 6% to about 11%.

References Cited

UNITED STATES PATENTS

| 107,088 | 9/1870 | Mouries. | |
| 3,189,463 | 6/1965 | Jones | 99—86 |
| 3,269,025 | 8/1966 | Dryden et al. | |
| 3,341,336 | 9/1967 | Jokay | 99—199 |

FOREIGN PATENTS 3,081   1875   Great Britain.

RAYMOND N. JONES, Primary Examiner

U.S. Cl. X.R.

99—90, 199